INVENTOR:
Robert M. Beck
By Smyth & Roston
Attorneys.

INVENTOR:
Robert M. Beck
By Smyth & Roston
Attorneys

INVENTOR:
Robert M. Beck
By Smyth & Roston
Attorneys,

United States Patent Office 3,221,323
Patented Nov. 30, 1965

3,221,323
DIGITAL CONVERTER

Robert M. Beck, Los Angeles, Calif., assignor, by mesne assignments, to Raytheon Company, Lexington, Mass., a corporation of Delaware
Filed Oct. 26, 1959, Ser. No. 848,652
13 Claims. (Cl. 340—347)

This invention relates to a converter and, more particularly to a digital-to-analog converter which provides an alternating current signal as the analog representation of an input digital signal.

A large proportion of computers and servomechanisms in current use in industrial and military control applications are alternating current systems. Alternating current systems have inherent advantages of which some of the more important are simplicity and freedom from drift of alternating current amplifiers, the reliability and ruggedness of alternating current servo induction motors, and the availability of certain inductive transducers, such as synchros. In the conventional alternating current system, the signal is in the form of the envelope of a suppressed-carrier modulated signal mathematically represented by $m(t)$ cos $wt$, where $m(t)$ is the modulating signal and cos $wt$ is the carrier. The term "suppressed carrier" is utilized because the carrier does not appear in the modulated signal if the modulating signal has no direct current component.

Alternating current systems utilize the suppressed carrier modulating signal because of its characteristic of phase reversal when the amplitude of the modulating signal reverses in polarity. A phase reversing signal to indicate polarity or direction of an error is particularly useful because the direction of rotation of the servo motors in the system is determined by the phase of the signal supplied thereto.

There are many applications requiring a suppressed carrier modulating signal for which the input information is available in digital form. For example, a control system may include a digital computer which controls analog positioning apparatus. For such applications, it is necessary to convert the digital input to an analog quantity and to generate a suppressed carrier signal in accordance therewith. The two steps, conversion and generation, or modulation, have heretofore been accomplished by separate apparatus because digital-to-analog converters are direct current converters which provide a signal having an instantaneous magnitude corresponding to the binary input at the particular instant.

In a specific illustrative embodiment of this invention, a digital-to-analog converter is provided which directly converts a digital quantity to a suppressed carrier modulated signal. The complement of the binary number instead of the binary number itself is introduced to the converter because the amplitude of the output signal varies inversely with the magnitude of the binary signal introduced thereto. By introducing the complement, the output signal varies directly with the binary input number.

The digits of the binary complementary number are introduced to individually associated stages each including two switching transistors. Depending upon the respective input digit, one or the other of the two transistors is conductive to couple a first or a second reference signal lead to an impedance network. The two reference signal leads extend from an alternating current source and the signals on the leads are out-of-phase sinusoidal signals. Depending, therefore, upon the condition of the switching transistors in each stage, one of the two out-of-phase signals is coupled to the impedance network.

The impedance network includes a number of serially connected resistors, with the junctions between successive pairs being connected individually to both of the switching transistors in the various stages. The serially connected resistors are all of equal impedance and the impedance of the reference signal path through each of the stages is equal. The amplitudes of the signals introduced at junctions of the impedance network are the same but due to the voltage divider effect of the resistors in the series arrangement, the fractional amplitudes at an output servo apparatus of the signals at the different junctions are different. Of the voltage at the junction closest to the output apparatus, one-half is introduced across the output apparatus, of the voltage at the next junction, one-quarter is introduced across the output apparatus, etc. In this manner, an alternating current component weighted by a binary factor is introduced from each of the stages to the output apparatus.

Features of this invention pertain to the provision of an analog signal in the form of an alternating current signal, with the amplitude of the signal indicating the polarity of the input binary number. The most significant alternating current component introduced to the output apparatus is indicative of the polarity of the input signal. To provide for this component, an additional input digit and stage is utilized for providing the phase controlling component indicative of the input number polarity.

Further features of this invention relate to the provision of means in each stage for establishing a predetermined sequence of operations when the input to the stage is changed to turn off the conductive switching transistor before the non-conductive switching transistor is turned on. The two switching transistors are positively interlocked so that both can never be on at the same instant to effectively couple both reference signals to the impedance network. The positive interlock is achieved utilizing three control transistors which receive the input signal, turn off the switching transistor which is conductive and then turn on the switching transistor which is non-conductive.

Still further features of this invention pertain to the provision of means for avoiding the introduction of a distortion component to the output signal due to coupling the reference signals through the switching transistors. Both the collector bias and emitter bias of the switching transistors vary sinusoidally, due respectively, to the signals through the impedance network and the reference signal leads. Both of these variations normally introduce a distortion component. The distortion due to the collector bias variation is avoided by operating the switching transistors at a linear portion of their operating characteristics, and the distortion due to emitter bias variation is minimized by utilizing relatively large base resistors.

Further advantages and features of this invention will become apparent upon consideration of the following description when read in conjunction with the drawings wherein.

Figure 1:
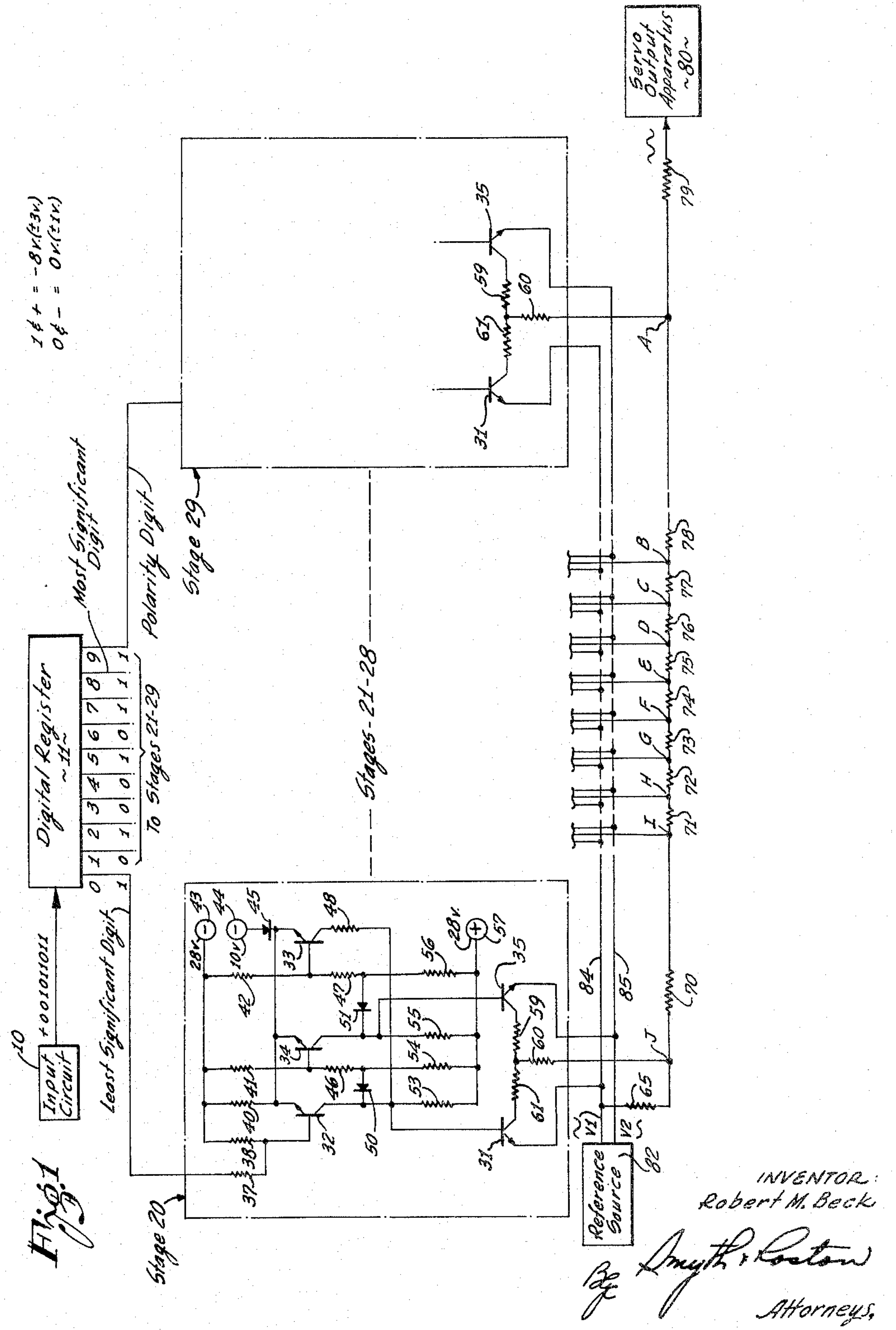
FIGURE 1 is a partial circuit representation and partial functional representation of the digital-to-analog converter of this invention.

Referring first to FIGURE 1, the digital-to-analog converter of this invention includes a digital input circuit 10 which may be a digital computer or any other apparatus which introduces digital signals for conversion to an analog signal. In the specific illustrative embodiment of this invention, the digital signals are binary signals having a maximum of 10 digits, with nine of them indicating the magnitude of a binary number and one indicating its polarity.

As is well known, in the binary numbering system there are two symbols, usually a 0 and a 1, which are arranged in a manner to indicate the various powers of 2. In the decimal numbering system there are ten symbols 0 through 9 which are arranged to indicate the various powers of 10. To illustrate the relationship between the two systems consider, for example, the 7 digit binary number 1011011. To convert the seven digit binary number to a decimal number, the following operation may be utilized:

$$1\times2^6+0\times2^5+1\times2^4+1\times2^3+0\times2^2+1\times2^1+1\times2^0$$

Expressed in decimal notation, the number equals 64+0+16+8+0+2+1 which totals 91, or $9\times10^1+1\times10^0$. The binary number 1011011, therefore is equal to the decimal number 91.

Assuming that the input binary number, which is to be converted by the digital-to-analog converter of this invention, is the positive seven digit number 1011011, signals representing the number are coupled either serially or in parallel to a digital register 11. The register 11 receives the positive seven digit number and provides at its output leads 0 through 8, inclusive, binary digital signals representing the two's complement of the received seven digit number.

The two's complement of a binary number is obtained merely by converting the 0's to 1's and the 1's to 0's and then adding 1 to the least significant 1 digit. The complement of the seven digit number 1011011 is 0100101. There is a reason for converting the binary input number to its complement in this invention so that the information to be converted to an analog signal is a complementary binary number. This reason will be readily understood upon consideration of the input signal depicted in FIGURE 2, curve (*b*) and the output signal depicted in FIGURE 2, curve (*c*). In curve (*b*) the solid curve represents a varying binary input from the input circuit 10 and the dash-curve represents the variation of the complement of the binary input from the register 11. The absolute magnitude of the complementary binary number varies inversely with the binary input number between 0 and 111111111 (511 in the decimal system). Illustratively, a maximum input number of 111111111 provides for a complementary binary number of 0 and vice versa.

The analog signal provided to an output apparatus 80 is an alternating current signal having an amplitude which varies inversely with the magnitude of the number provided at the output leads 0 through 8 of the register 11. By introducing the complement of the input number instead of the number itself, the amplitude of the output signal corresponds directly with the magnitude of the input number as indicated in curve (*c*) of FIGURE 2 so that the servomechanism or servo output apparatus 80 is adjusted directly in accordance therewith. In order, therefore, to provide an output signal which is useful at the servo output apparatus 80, a complementary representation of the input binary number is utilized so that a direct instead of an inverse relationship exists between the output signal amplitude and the binary input number from the circuit 10.

At the leads 0 through 8, inclusive, from the register 11, the binary digits are indicated by two different potentials. A 0 binary digit is indicated by a 0 volt potential and a 1 digit is indicated by a minus 8 volt potential. Actually, the accuracy of the converter is not reduced for variations in the magnitude of the input potentials from plus 1 volt to minus 1 volt for the 0 digit and from minus 11 to minus 5 volts for the 1 digit. Of the ten leads 0 through 9, only nine of the leads 0 through 8 are utilized to indicate the magnitude of the input number with the lead 9 being utilized to indicate its polarity. A positive binary number is indicated at the lead 9 by a minus 8 volt potential and a negative number is indicated thereat by a 0 volt potential.

With an input number of +001011011 from the circuit 10, a 9 digit complementary number of +110100101 is indicated respectively at the leads 8 through 0 inclusive. The least significant digit is indicated at the lead 0, the next least significant digit at the lead 1, etc., to the most significant digit at the lead 8. The digital indication at the lead 9 is 1 to indicate that the complementary number to be converted is positive. With the complementary number being as indicated above and as depicted in FIGURE 1 at the leads 0 through 9, the potential at the leads 1, 3, 4 and 6 is 0 volts and at the leads 0, 2, 5, 7, 8 and 9 is minus 8 volts.

The converter includes ten stages or electronic switches 20 through 29, inclusive, which are respectively coupled to the leads 0 through 9, inclusive, from the register 11. Each of the stages 20 through 29 assumes one or the other of two conditions depending upon the magnitude of the voltage supplied thereto from the register 11. Each of the stages 20 through 29 functions effectively as an electronic switch to couple one or the other of two reference signal leads 84 and 85 to respectively associated junctions J through A between a series arrangement of 10 resistors 70 through 79 which are coupled to the servo output apparatus 80. In this manner, depending upon the conditions of the stages 20 through 29, the various junctions J through A between the serially connected resistors 70 through 79 are each effectively coupled by the associated stages 20 through 29 to one or the other of the leads 84 and 85.

The leads 84 and 85 extend from a reference signal source 82 which provides two opposite polarity sinusoidal signals to the leads 84 and 85. In the curve (*a*) of FIGURE 2, the signal on the lead 84 is illustrated as a solid curve and the signal on the lead 85 is illustrated as a dash-curve. The signal on lead 85 is of identical magnitude but of opposite phase with respect to the signal on the lead 84. The peak-to-peak voltage of the reference signals on the leads 84 and 85 is illustratively 14 volts and the frequency of the reference signals is illustratively 100 kilocycles. The maximum instantaneous difference in potential between the two leads 84 and 85 is, therefore, 14 volts with the minimum difference being 0 volts.

Figure 4:
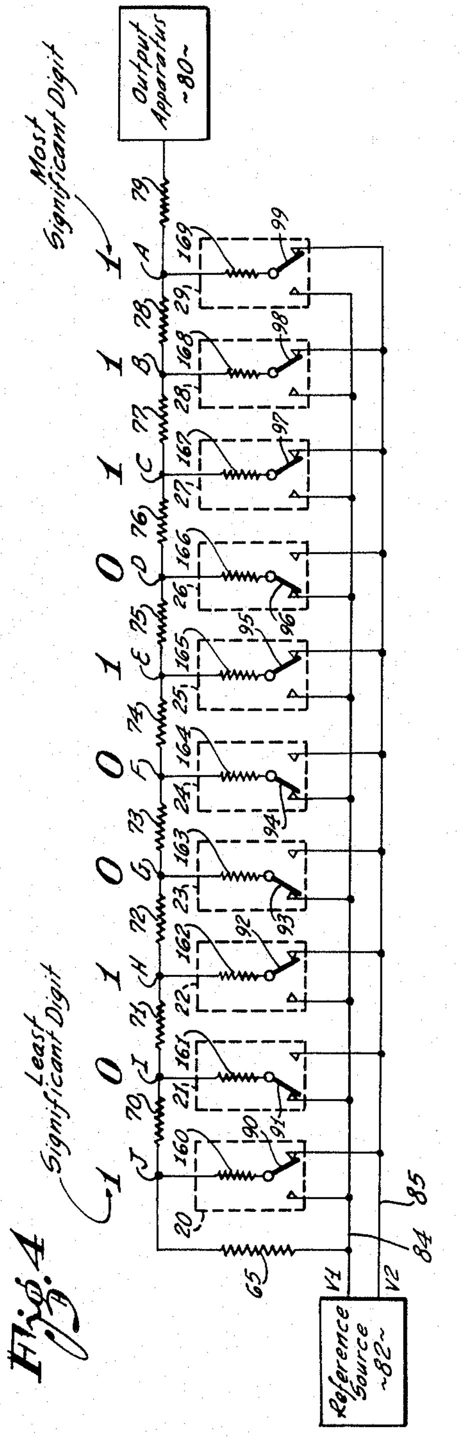
FIGURE 4 is a first functional representation of the digital-to-analog converter of this invention illustrating the effect of the individual electronic switch stages.
Figure 5:
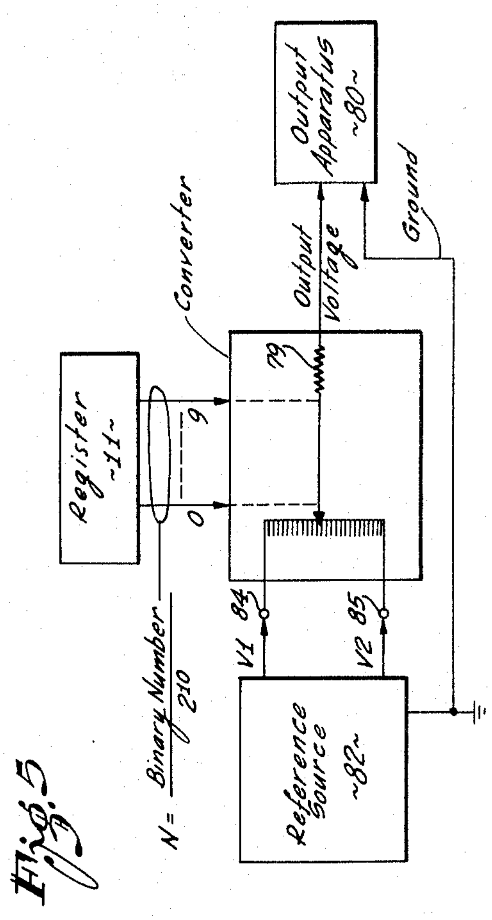
FIGURE 5 is a second functional representation of the digital-to-analog converter of this invention illustrating the cumulative effect of the electronic switch stages.

Before proceeding with a detailed description of the stages 20 through 29, inclusive, consider first the functional operation of the digital-to-analog converter in reference to FIGURES 4 and 5. FIGURE 4 includes a diagrammatic representation of the ten stages 20 through 29, inclusive, and the manner in which they function to couple the two reference signal leads 84 and 85 to the junctions of the serially connected resistors 70 through 79, inclusive. FIGURE 5 illustrates the cumulative effect of the stages 20 through 29 and the manner in which the converter functions effectively as a voltage divider to couple the reference signals appearing at the leads 84 and 85 through the resistor 79 to the output apparatus 80.

The voltage provided to the output apparatus 80 may be represented by the following mathematical relationships:

$$vo=N(v2-v1)+v1$$

or by rearranging terms $$vo=Nv2+(1-N)v1$$

where $vo$ is the output voltage, N is a number equal to or greater than 0 and less than 1, $v2=7 \sin wt$ and $v1=-7 \sin wt$. The symbol 2 represents the frequency in radians, the letter $t$ indicates the time variable, $v1$ is the signal on lead 84 and $v2$ is the signal on lead 85. N is a fraction which has a numerator equal to the ten digit binary number provided from the register 11 and a denominator equal to $2^{10}$. The 1 or the 0 digit at the lead 9 from the register 11 is considered as the most significant digit of the ten digit number with the indicated digits at leads 8 through 0 being the other 9 digits. A maximum number at the leads 9 through 0 is, therefore, a ten digit number 1111111111 which is one bit less than $2^{10}$, the denominator of the fraction equal to N. The fraction N, therefore, indicates the relative position of the ten digit binary number provided from the register 11 in a range between 0 and $2^{10}$. The most significant digit of the 10 digit number indicates the polarity of the input binary number and determines whether N is larger or smaller than one-half.

Figure 2:
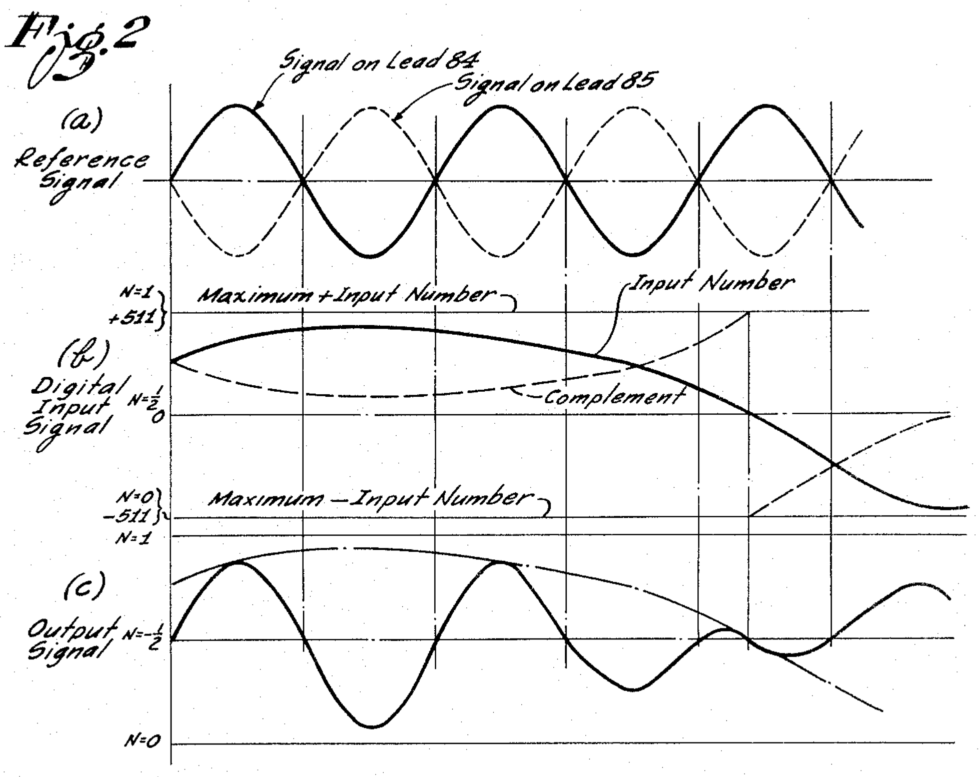
FIGURE 2 is a series of curves illustrating the operation of the digital-to-analog converter of this invention.

By substituting the expressions for $v1$ and $v2$ in the equation for the output voltage $vo$, the output voltage $vo$ becomes equal to $(14N-7) \sin wt$. A consideration of the equation for the output voltage indicates that when N is less than one-half, the output signal is negative being 180 degrees out-of-phase with respect to the output signals provided for positive signals where N is between one-half and 1. This relationship is also illustrated in FIGURE 2, curve (*c*). As the number N is reduced from 1 toward 0, the ampitude of the output signal reduces accordingly therewith until, when N equals one-half, the amplitude of the output signal is 0. Thereafter, as N is further reduced from one-half towards 0, the amplitude of the output signal is again increased but is now 180 degrees out-of-phase with respect to the output signals provided for values of N greater than one-half.

Further reference will be made to the functional representation of the converter illustrated in FIGURES 4 and 5 after a more detailed consideration of the stages 20 through 29 with reference to FIGURE 1.

The stages 20 through 29 are identical, each including five NPN junction transistors 31 through 35. The two transistors 31 and 35 are switching transistors and one or the other thereof is conductive depending upon the potential on the associated lead from the register 11. When the input potential is minus 8 volts indicating a 1 digit, the transistors 31 and 34 are conductive and when the input potential is 0 volts, the transistors 32, 33 and 35 are conductive. When the input potential is changed in either direction from minus 8 to 0 volts or from 0 volts to minus 8 volts, a predetermined sequence of operations occurs under control of the three transistors 32, 33 and 34 for first turning off the switching transistor which is conductive and then for turning on the switching transistor which is non-conductive.

Considering first that the input digit on lead 0 is changed from a 1 digit to a 0 digit, the sequence of operations is such as to first turn off the transistor 31 and then to turn on the transistor 35. With 0 volts at the lead 0, a relatively positive potential (approximately minus 9 volts) is provided at the base electrode of the junction transistor 32. The base electrode of the transistor 32 is coupled to the junction between two serially connected resistors 37 and 38 which form a voltage divider between the lead 0 from the register 11 and a minus 28 volt negative potential source 43. The emitter electrode of the transistor 32 is coupled through a resistor 40 to the negative 28 volt potential source 43 so that the relatively positive potential at its base electrode causes it to be conductive. Positive potential is provided to the collector electrode of the transistor 32 from a plus 28 volt potential source 57 through a resistor 53.

The emitter electrodes of all three control transistors 32, 34 and 33 are multiplied to a diode 45 which is in turn connected to a minus 10 volt potential source 44. The emitter potential of the control transistors 32, 34 and 33 cannot, therefore, decrease below minus 10 volts. By limiting the negative magnitude of the potential at the emitter electrodes, the emitter-to-base potentials can never exceed a predetermined maximum value. The diode 45 and the source 44, therefore, function as a safety device to prevent overloading the transistors 32, 34 and 33.

When the transistor 32 becomes conductive, the decrease in potential at its collector electrode causes the switching transistor 31 to become non-conductive. The collector electrode of the transistor 32 is directly connected to the base electrode of the switching transistor 31. The emitter electrode of the transistor 31 is connected to the reference signal lead 84, and its collector electrode is coupled through an individually associated resistor 61 and a resistor 60, which is common to both switching transistors 31 and 35, to the resistor 70. As described above, the resistor 70 forms part of the series impedance network coupled between the reference source 82 and the servo output apparatus 80. The decrease of potential at the base of the transistor 31 reverse biases the base-to-emitter junction causing the transistor 31 to turn off or become non-conductive.

The emitter potential of the transistor 31 varies sinusoidally between plus 7 and minus 7 volts due to the reference signal on the lead 84 so that the transistor 31 is non-conductive throughout the reference signal cycle when its base potential becomes more negative than minus 7 volts. When the collector potential of the transistor 32, therefore, reduces to minus 7 volts, the switching transistor 31 becomes non-conductive.

In addition to controlling the transistor 31, the transistor 32 also functions to turn off the control transistor 34 which is conductive at the time the input potential changes from minus 8 to 0 volts. The collector electrode of the transistor 32 is coupled by a diode 50 to the junction between two resistors 46 and 54 which, together with a resistor 41, form a voltage divider between the negative potential source 43 and the positive potential source 57. The diode 50 is poled in the direction of positive collector current, and its positive terminal or anode is at a negative potential of approximately minus 8 volts as determined by the voltage divider when the transistor 34 is not conductive. The diode 50 does not, therefore, become forward biased until after the collector potential of the control transistor 32 becomes more negative than minus 8 volts. The bias provided by the voltage divider when the transistor 34 is conductive, therefore, maintains the diode 50 reverse-biased until after the transistor 31 is turned off by the decrease of base potential to minus 7 volts. The circuit parameters are selected to provide for this particular sequence with the transistor 31 turning off before the diode 50 becomes forward-biased.

When the diode 50 becomes forward-biased the potential at the junction between the resistors 46 and 54 decreases with the collector potential of the transistor 32. The potential at the other junction of the voltage divider, between the resistors 41 and 46, therefore, also decreases. When the potential at the junction between the resistors 41 and 46 decreases, it reverse biases the base-to-emitter junction of the transistor 34 causing it to become nonconductive. The emitter electrode of the transistor 34 is coupled through resistor 40 to the source 28, and its collector electrode is coupled through the resistor 55 to the source 57.

When the transistor 34 is turned off, its collector potential increases to reverse bias a second diode 51 in the stage 20. The positive terminal or anode of the diode 51 is connected to the junction between two resistors 47 and 56 which, together with a resistor 42, form a serial voltage divider arrangement between the sources 43 and 57. When the diode 51 becomes reverse-biased, the potential at the junctions between the resistors 47 and 56 and between the resistors 42 and 47 increases. The increase in potential at the junction between the resistors 42 and 47 forward-biases the base-to-emitter junction of the control transistor 33 causing it to become conductive.

In addition to being connected to the cathode of the diode 51, the collector electrode of the control transistor 34 is also connected to the base electrode of the transistor 35. The emitter electrode of the transistor 35 is connected to the reference signal lead 85 so that its potential varies sinusoidally between plus and minus 7 volts. The circuit parameters are such that the diode 51 becomes reversed-biased and the transistor 33 becomes conductive before the base potential of the transistor 35 becomes sufficiently positive to fully turn on the transistor 35. Illustratively, the collector potential of the transistor 34 for reverse-biasing the diode 51 may be plus 3 volts.

The circuit arrangement coupled to the collector electrode of the transistor 34 including the diode 51, the voltage divider, and the transistors 33 and 35 is actually quite similar to the circuit arrangement coupled to the collector electrode of the transistor 32. The corresponding circuit arrangement coupled to the collector electrode of the transistor 32 includes the diode 50, the voltage divider consisting of the resistors 41, 46 and 54, and the transistors 34 and 31. When the transistor 32 turns on, it first turns off the transistor 31 and then reverse-biases the diode 50 to turn off the transistor 34. When the transistor 34 turns off, it reverses the control sequence with respect to the diode 51 connected thereto by first reverse biasing the diode 51 to turn on the transistor 33 and then turns on the transistor 35. The reversal of the sequence is due to the difference of potentials at the anodes of the two diodes 50 and 51 when the transistor 32 turns on the transistor 34 turns off.

At the time the sequence of operations is initiated by changing the input potential from minus 8 to zero volts, the transistors 32, 33 and 35 are nonconductive and the transistors 31 and 34 are conductive. With the transistor 34 conductive, the anode potential of the diode 50 is relatively negative at approximately minus 8 volts, whereas with the transistor 33 non-conductive, the anode potential of the diode 51 is approximately plus 3 volts. Depending, therefore, upon the conductive condition of the transistor coupled to its anode, the anode potentials of the diodes 50 and 51 are either plus 3 or minus 8 volts. With an anode potential of minus 8 volts, the diode 50 becomes forward biased after the transistor 31 is fully turned off at a base potential of minus 7 volts, and with an anode potential of plus 3 volts, the diode 51 becomes reverse-biased before the transistor 35 is fully turned on.

In this manner, it is impossible for the transistor 35 to become conductive until after the transistor 31 has been turned off. This feature is provided to avoid simultaneous conduction of the transistors 31 and 35 which effectively would couple both reference signal leads 84 and 85 to the impedance network consisting of the serially connected resistors 70 through 79.

In a similar manner, when the input potential is changed from 0 volts to minus 8 volts to indicate a change of the input digit from 0 to 1, a sequence is initiated for first turning off the switching transistor 35 and then for turning on the switching transistor 31. The decrease of input potential at the lead 0 reverse-biases the base-to-emitter junction of the transistor 32 causing it to turn off. The increase of collector potential at the transistor 32 reverse-biases the diode 50 to permit the transsistor 34 to become conductive. When the transistor 34 becomes conductive, the potential at its collector electrode decreases to turn off the transistor 35. After the transistor 35 is turned off, the collector potential of the transistor 34 decreases to forward bias the diode 51 and in turn to turn off the transistor 33. When the transistor 33 is turned off, its collector potential increases to increase the base potential of the transistor 31 causing it to become conductive. The base electrode of the transistor 31 is coupled to the collector electrode of the transistor 33 by a resistor 48.

The transistor 31 cannot become conductive until after the transistor 33 is turned off because its base potential is maintained at a relatively negative potential as long as the transistor 33 is conductive. Both of the control transistors 32 and 33 must be turned off in order for the transistor 31 to become conductive.

The stage 20 functions to couple either the reference signal on the lead 84 or the reference signal on the lead 85 to the impedance network consisting of the serially connected resistors 70 through 79. With the switching transistor 31 in stage 20 conductive, the reference signal through the lead 84 is coupled through the transistor 31 and the serially connected resistors 61 and 60 to the junction J between the resistor 70 and a resistor 65. The other end of the resistor 65 is also connected to the reference signal lead 84. When the transistor 35 is conductive instead of the transistor 31, the reference signal on the lead 85 instead of on the lead 84 is coupled to the junction J between the resistors 70 and 65. The conductive connection from the lead 85 is through the transistor 35, the collector resistor 59 and the resistor 60. The instantaneous magnitude of the potential at the junction J is the same for either connection but the polarities are different. The reason for the magnitudes being identical is that the two reference signals respectively at the leads 84 and 85 have similar amplitudes and frequencies but are 180 degrees out-of-phase with each other as described above and illustrated in FIGURE 2, curve (*a*).

In a similar manner, each of the stages 21 through 29 functions to couple one or the other of the reference signal leads 84 and 85 to an associated one of the junctions J through A of the impedance network coupled to the ouput apparatus 80. The stage 29 which is functionally depicted, for example, couples one or the other of the leads 84 and 85 to the junction A between the resistors 78 and 79.

The resistors 70 through 79 are all identical having an impedance, illustratively, of 20 kilo-ohms and the resistor 65 has twice the impedance or an impedance of 40 kilo-ohms. The impedance through any one of the stages 20 through 29, including that of the selectively energized transistors 31 and 35 is also twice the impedance of any one of the resistors 70 through 79. For example, the collector-to-emitter impedance of the transistor 31, when it is conductive, may be 30 ohms, the resistor 61 may be 270 ohms and the common resistor 60 may be 29.7 kilo-ohms so that the total impedance between the lead 84 and the junction J between the resistors 65 and 70 is 40 kilo-ohms. The magnitude of these components is significant in determining the potential effect at the output apparatus 80 of each of the stages 20 through 29. The stage 20 which is coupled to the impedance network at a point furthest from the output apparatus 80 has the least effect on the amplitude of the output signal provided to the output apparatus 80. Each of the succeeding stages 20 through 29 has twice the effect on the output signal amplitude as its next preceding stage with the stage 29 having the greatest effect. The reason for this binary factor effect of the impedance network and the stages 20 through 29 may be understood upon consideration of the functional representation of the converter as depicted in FIGURE 4.

As shown in FIGURE 4, each of the stages 20 through 29 is represented by a resistor and a two-position switch. The stages 20 through 29 include respectively the resistors 160 through 169 and the switches 90 through 99. The switches 90 through 99 are set to indicate the binary complementary number from the register 11 which is indicated in FIGURE 4 above the stages 20 through 29. The resistors 160 through 169 each represent the 40 kilo-ohms impedance through the stage between one of the reference leads 84 and 85 and an associated one of the junctions J through A in the impedance network coupled to the output apparatus 80.

Consider first the effect of a voltage introduced at the junction A at the junction between the resistors 78 and 79 from the lead 85 through the stage 29. The output apparatus 80 presents illustratively an impedance of 20 kilo-ohms to the converter, and the resistor 79 is a 20 kilo-ohms resistor so that one-half of the voltage appearing at the junction A is introduced to the output apparatus 80. Starting at the junction B which is the next junction in the series arrangement of the resistors 70 through 79, the impedance network to the right includes the 20 kilo-ohms resistor 78 and a parallel arrangement of two 40 kilo-ohms branches. One branch includes the resistor 79 and the output apparatus 80 and the other branch includes the resistor 169 in the stage 24. The cumulative impedance effect of the two branches is 20 kilo-ohms so that the total impedance to the right of the junction B is 40 kilo-ohms. One-half of the potential introduced at the junction B through the stage 28 appears across the resistor 78 and across each branch of the parallel arrangement connected thereto. Of the one-half that appears across the branch including the resistor 79 and the output apparatus 80, one-half is introduced across the output apparatus 80. In this manner, one-quarter of the potential introduced at the junction B appears at the output apparatus 80.

In a similar manner, the impedance presented at the junction C between the resistors 76 and 77 is also 40 kilo-ohms to the right. The 40 kilo-ohm impedance presented at the junction B is in parallel with the resistor 168 to provide a composite impedance of 20 kilo-ohms which is in series with the resistor 77. The potential introduced at the junction C is divided across the resistors 77 through 79 with one-half the potential being across the resistor 77, one-quarter of the potential being across the resistor 78 and one-eighth of the potential being across the resistor 79 and also across the output apparatus 80. For a potential introduced at the junction D between the resistors 75 and 76, one-sixteenth thereof is introduced to the output apparatus 80. In this manner, at each succeeding junction A through J in the series arrangement of resistors 70 through 79, inclusive, the effect of an introduced signal is divided by a factor of two.

The impedance presented at any one of the junctions A through J when viewed in either direction is the same. For example, at the junction I between the resistors 70 and 71, the impedance to the left includes the 20 kilo-ohm resistor 70 and two 40 kilo-ohm branches, one including the resistor 65 and the other including the resistor 160 in the stage 20. The combined impedance is, therefore, 40 kilo-ohms to the left as well as 40 kilo-ohms to the right. The right and the left impedance presented at the junction I form two parallel branches which are connected to the resistor 161 of the stage 21. At the switch 91, therefore, a total impedance of 40 kilo-ohms due to the resistor 161 is serially connected to two 40 kilo-ohm branches so that the potential at the junction I is somewhat smaller than at the reference lead 84.

Considering the particular illustrative binary complementary number depicted in FIGURE 4, as indicated also by the selective positions of the switches 90 through 99, potentials of one phase are introduced at the junctions A, B, C, E, H and J and of opposite phase at the junctions D, F, G and I. At the output apparatus 80, the composite signal due to the various binary components is an alternating current signal having a maximum amplitude determined by the potentials introduced at the junctions B through J and a phase determined by the potential introduced at the junction A. The phase is determined by the signal introduced at the junction A because its instantaneous amplitude is greater than the cumulative amplitude of the signals introduced at all of the junctions B through J.

In this manner, though the series resistors 70 through 79 all present the same impedance and the parallel stages 20 through 29 also present identical impedances, a binary impedance effect is achieved by particular arrangement and operation of the impedance network and the stages 20 through 29.

Figure 3:
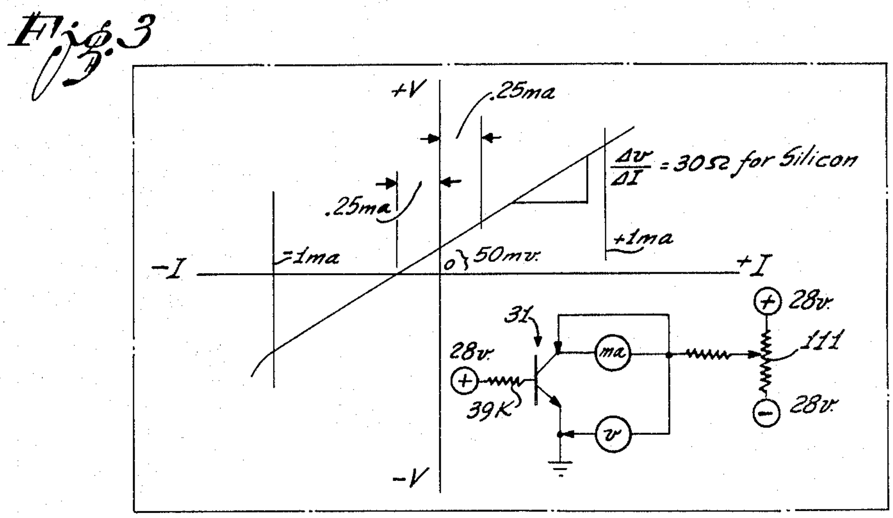
FIGURE 3 is a curve illustrating the operation of the switching transistors in the digital-to-analog converter of this invention.

The switching transistors 31 and 35 described above in reference to FIGURE 1 do not distort the sinusoidal reference signals coupled from the reference signal leads 84 and 85. FIGURE 3 illustrates the operation of one of the switching transistors for variations of collector bias. The collector bias for the switching transistors varies because as indicated in FIGURE 1 the collectors of the transistors 31 and 35 are coupled to an associated one of the junctions A through J. The potential at the junctions A through J of the impedance network varies sinusoidally to correspondingly vary the collector bias for the switching transistors in each of the stages 20 through 29. The variation in collector bias, however, does not affect the linearity of operation of the switching transistors. As illustrated in FIGURE 3, the impedance curve of the switching transistor 31 is linear for collector currents between plus 1 and minus 1 milliamperes as the collector voltage is varied and has a slope of 30 ohms. The slope of 30 ohms and a 50 millivolt offset is a characteristic of silicon transistors. When germanium transistors are utilized, the slope and offset are smaller. The switching transistor 31 is operated over a relatively small current range actually between ±0.25 milliampere so as to avoid distorting the reference signals coupled through the emitter collector junction.

In the circuit representation included in FIGURE 3, the equivalent effect of variation of the collector bias may be provided and measured by adjusting the potentiometer 111. As the potentiometer 111 is adjusted to duplicate the variation of potential occuring at any one of the junctions A through J, current through the milliammeter and voltage across the voltmeter can be determined.

The linearity of the switching transistors 31 and 35 is also affected by the emitter bias which varies sinusoidally due to the reference signals at the leads 84 and 85. Though a minor distortion component is introduced due to this effect, it is relatively small compared to the effect that would be due to a varying collector bias and moreover the effect is reduced by utilizing relatively large base resistors 53 and 55. Because of the large resistors 53 and 55, the emitter bias across the base-to-emitter junction of a switching transistor when it is conductive, varies by only a small percentage. The output signal, therefore, introduced to the servo output apparatus 80 due to the binary components introduced at the junctions A through J is substantially sinusoidal in shape.

Illustrative magnitude of some of the circuit parameters including those of the potential sources 43 and 57 and of the resistors 70 through 79 were indicated above. The reason for providing these parameters was merely to more clearly illustrate the operation of the converter. The following is a more complete list of illustrative circuit parameters including those mentioned above:

| | | |
|---|---|---|
| 0 digit at leads **0** through **9** | volts | 0±1 |
| 1 digit at leads **0** through **9** | do | −8±3 |
| Resistor **38** | kilo-ohms | 33 |
| Resistor **40** | do | 8.2 |
| Resistors **41** and **42** | do | 120 |
| Resistors **46** and **47** | do | 4.7 |
| Resistors **54** and **56** | do | 100 |
| Resistors **53** and **55** | do | 39 |
| Transistors **31** through **35** | | NPN–2N619 |
| Resistor **48** | kilo-ohms | 2.2 |
| Source **43** | volts | −28 |
| Source **57** | do | +28 |
| Source **44** | do | −10 |
| Resistors **59** and **61** | ohms | 270 |
| Resistor **60** | kilo-ohms | 39.7 |
| Resistor **65** | do | 40 |
| Resistors **70** through **79** | do | 20 |

Although this application has been disclosed and illustrated with reference to particular applications, the principles involved are susceptible of numerous other applications which will be apparent to persons skilled in the art. For example, the five transistors 31 through 35 may be PNP junction transistors instead of NPN junction transistors with the diodes 50 ad 51 being reversed and the potential sources being of opposite polarity. The invention is, therefore, to be limited only as indicated by the scope of the appended claims.

I claim:

1. Apparatus for providing an analog indication as to the value represented by a plurality of signal indications, including, a plurality of switching arrangements each being provided for a different digit of the value represented by the signal indications, each of the switching arrangements being constructed to provide first and second states of operation, a source of first and second alternating reference signals having a particular frequency and having an opposite phase relative to each other, the source being coupled to each of said switching arrangements to pass the first reference signal upon the operation of the switching arrangement in the first state and to pass the second reference signal upon the operation of the switching arrangement in the second state, an impedance network having a plurality of junctions individually connected to said switching arrangements for combining the reference signals passing from said switching arrangements, the impedance network including a plurality of equal impedance means connected in series relationship for weighting the signals passing from said switching arrangements in accordance with the digital significances of the signal indications introduced to the switching arrangements, and means coupled to said impedance network for providing an alternating signal having the particular frequency and having an instantaneous magnitude and phase dependent upon the weighted pattern of the first and second reference signals passing through the switching arrangements.

2. Apparatus for providing an alternating current signal having an amplitude dependent upon the value represented by a plurality of signal indications, including, a plurality of switching arrangements each being provided for a different digit of the value represented by the signal indications, each of the switching arrangements including impedance means and being provided with first and second states of operation, a source of an alternating reference signal having a particular frequency, the source being coupled to each of said switching arrangements to pass the reference signal in a first phase upon the operation of the switching arrangement in the first state and to pass the reference signal in a second phase displaced from the first phase in a particular relationship upon the operation of the switching arrangement in the second state, an impedance network having a plurality of equal impedance elements and a plurality of junctions between said elements, the junctions being individually connected to said impedance means of said switching arrangements to receive the reference signals passing through the switching arrangements, the impedance elements being provided with values being one-half of said switching arrangement impedance means values for weighting the reference signals passing through the switching arrangements in accordance with the digital significances of the signal indications, and means coupled to one end of said impedance network for providing an alternating signal having an instantaneous amplitude dependent upon the pattern of the first and second phases in the reference signals passing through the switching arrangements and upon the weighting by the impedance network of the signals passing through the switching arrangement.

3. A digital-to-analog converter for converting a digital value to an analog indication in the form of an alternating current signal, including, a source of signals having first and second characteristics in a pattern representing a digital number to be converted, means coupled to said source for providing signals having first and second characteristics in a pattern representing a complement of the digital number to be converted, a plurality of switching arrangements each being provided for a different digit of the complement of the digital value and having first and second states of operation and being responsive to the signals representing an associated digit of the complement of the digital value for assuming a particular one of its first and second operative states in accordance with the first and second characteristics of such signals, a source of alternating reference signals having a particular frequency, the source being coupled to each of said switching arrangements to obtain the passage of the signals through the switching arrangement at the particular frequency and in a first phase upon the operation of the switching arrangement in the first state and to obtain the passage of the signals through the switching arrangement at the particular frequency and in a second phase displaced from the first phase upon the operation of the switching arrangement in the second state, and an impedance network having a plurality of junctions individually connected to said switching arrangements for combining the alternating current signals of the first and second phases from said arrangements in a particular weighted relationship to provide an output signal at the particular frequency with an amplitude and polarity representing the analog indication.

4. A digital-to-analog converter for converting a digital value to an analog indication, including, a source of digital signals having first and second characteristics in a pattern representing the digital value to be converted, first means coupled to said source for providing second digital signals having first and second characteristics in a pattern representing a complement of the digital value to be converted, a plurality of switching arrangements each coupled to said first means for a different digit of the complementary binary number and having first and second operative states and being responsive to the associated digital signal included in the complement of the digital value for assuming the first operative state upon the occurrence of the first characteristic for the associated digital signal and for assuming the second operative state upon the occurrence of the second characteristic for the associated digital signal, a source of first and second alternating reference signals having a particular displacement in phase and having a particular frequency, the source being coupled to each of said switching arrangements to obtain a passage of the first reference signals through the switching arrangement upon the operation of the switching arrangement in the first state and to obtain a passage of the second reference signals through the switching arrangement upon the operation of the switching arrangement in the second state, an impedance network having a plurality of impedance elements and a plurality of junctions between such impedance elements, means individually coupling said junctions of said impedance network to said switching arrangements for combining said alternating reference signals passing through the switching arrangements in a particular weighted arrangement corresponding to the weighting of the digital signals in the digital value, and an analog output apparatus coupled to one end of said impedance network for producing a composite alternating signal having the particular frequency and having an amplitude and phase in accordance with the pattern of the alternating current signals introduced from said switching arrangements to said junctions of said impedance network and in accordance with the weighting provided on such signal by the impedance network.

5. A digital-to-analog converter for converting a digital value to an analog indication in the form of an alternating signal, including, a source of digital signals having first and second characteristics in a pattern representing the digital value to be converted; first means coupled to said source for providing digital signals having first and second characteristics in a pattern representing a complement of the digital value to be converted; a plurality of switching arrangements coupled to said first means, each of said switching arrangements being provided for a different digit of the complementary digital value and first and second operative states and being responsive to the signal representing the associated digit for the complementary digital value for assuming the first operative state in accordance with the first characteristics of the signal and for assuming the second operative state in accordance with the second characteristics of the signal, each of said switching arrangements including first and second switching devices having normal and operative states, means coupled to said first and second switching devices for each switching arrangement for preventing a change in the operation of each of said first and said second switching devices from said normal to said operative states during the time the other of said switching devices is in said operative state, and means responsive to a change of the associated digit indicated by the digital signals from the first means for changing the operative states of said first and second switching devices in accordance with such change; a source of a first alternating reference signal having a particular frequency, the source being coupled to said first switching device in each of said switching arrangements to obtain a passage of the reference signal through the switching device in the operative state of the switching device; a source of a second alternating reference signal having a particular frequency and having an opposite phase to the first reference signal, the source being coupled to said second switching device in each of said switching arrangements to obtain a passage of the second reference signal through the switching device in the operative state of the switching device; an impedance network having a plurality of impedance elements and a plurality of junctions individually connected to said switching arrangements, the impedance elements being provided with values to provide a weighting of the reference signals passing from the switching arrangements through the impedance network in accordance with the weighting of the values represented by the digital signals; means connecting said junctions of said impedance network to said first and said second switching devices of said individually associated switching arrangements whereby the first and second reference signals are coupled to said junctions in accordance with the operative conditions of said devices in said switching arrangements; and an analog output apparatus coupled to said impedance network for receiving the reference signals introduced to said junctions of said impedance network from said switching arrangements to provide an alternating output signal having the particular frequency and having an amplitude and a polarity representing the analog value.

6. A digital-to-analog converter, including, a source of first and second alternating reference signals having a particular frequency and having a particular phase displacement relative to each other, analog output apparatus, an impedance network coupled to said output apparatus for introducing an alternating signal at the particular frequency to said output apparatus, said impedance network including a plurality of impedance elements having similar values and having said impedance element at one end of the serial connection connected to said analog output apparatus to obtain the production of an alternating signal at the particular frequency by the output apparatus in accordance with the introduction of signals to the different impedance elements of the network, a plurality of switching arrangements each having first and second states of operation and being coupled between said source and different ones of said impedance elements of said network for introducing the first alternating signal from said source to the associated impedance element of said network upon the operation of the switching arrangement in the first state and for introducing the second alternating signal from the source to the associated impedance element of the network upon the operation of the switching arrangement in the second state, and means coupled to said plurality of switching arrangements for simultaneously and selectively operating said switching arrangements in particular ones of said first and second states in accordance with the values of a plurality of digits representing a value.

7. A digital-to-analog converter for converting a plurality of input signals having first and second characteristics representative of the value of different digits to an analog output signal, including, a plurality of impedance elements individually responsive to different input signals and connected in a circuit to weight the signals introduced to the impedance elements in accordance with the relative values of the different digits, a plurality of switching means each having first and second states of operation and each being connected to a respective one of said impedance elements, a first source of an alternating potential at a particular frequency, a second source of an alternating potential having the particular frequency and having a particular phase displacement relative to the potential from the first source, the first and second sources being connected to each of said switching means to obtain the introduction to said impedance element connected to said switching means of the alternating potential from a particular one of the first and second sources in accordance with the operation of the switching means in a particular one of the first and second states, an output circuit connected to a particular one of said plurality of impeance elements to produce an output voltage in accordance with the pattern of the alternating potentials introduced to the impedance elements from the first and second sources and in accordance with the weighting provided by the impedance elements, and means coupled to each of said switching means for operating each of said switching means to a particular one of said first and second states in accordance with the occurrence of the first and second characteristics in the input signals.

8. A digital-to-analog converter for converting to an analog output signal a plurality of input signals having first and second characteristics in representation of different digits, including, output apparatus for producing the analog output signal, an impedance network coupled to said output apparatus and having a weighting arrangement and a plurality of terminals for coupling to said output apparatus particular portions of signals introduced to the different terminals of the impedance network to obtain the production of an output signal by the output apparatus in accordance with the pattern of the signals coupled to the impedance network, a source of two reference potentials having a particular alternating frequency and having a particular phase displacement relative to each other, a plurality of switching arrangements each having first and second states and each coupled between said source and said impedance network for introducing a particular one of said two reference potentials from said source to said impedance network in accordance with the operation of the switching arrangement in the first and second states, and means coupled to said plurality of switching arrangements for selectively operating said switching arrangements in the first and second states in accordance with the pattern of the first and second characteristics in the input signals.

9. A digital-to-analog converter in accordance with claim 8 wherein said impedance network includes a plurality of resistors individually connected to said plurality of switching arrangements and further includes means connecting said resistors in a series arrangement to said output apparatus.

10. A digital-to-analog converter in accordance with claim 9 wherein said two reference potentials from said source are sinusoidal signals of equal amplitude and of opposite phases to obtain alternating signals having a phase and amplitude dependent upon the operation of the respective switching arrangements in the first and second states and upon the weighting provided by the resistors in the impedance network.

11. A digital-to-analog converter in accordance with claim 10 wherein each of said switching arrangements includes similar switching components to provide said arrangements with substantially equal impedances between said source and said network.

12. A digital-to-analog converter for converting a plurality of input signals to an analog output signal representative of the pattern of characteristics of the input signals, including, output apparatus for producing the analog output signal, a network formed from a plurality of impedances and coupled to said output apparatus and provided with a plurality of terminals to introduce particular fractions of signals to said output apparatus in accordance with the introduction of signals to the terminals in the network and in accordance with the values of the impedances in the network and in representation of the weighted values of the input signals to obtain the production of the analog output signal by the output apparatus, a source of two reference potentials having a particular frequency and having a particular phase displacement relative to each other, a plurality of switching arrangements each having first and second states of operation and each coupled between said source and said impedance network for introducing a particular one of said two reference potentials from said source to said impedance network in accordance with the operation of the impedance network in the first and second states, means coupled to said plurality of switching arrangements and responsive to the input signals for selectively operating said switching arrangements in the first and second states in accordance with the characteristics of the input signals in the plurality, and means coupled to each of said switching arrangements for preventing the simultaneous operation of each individual one of said arrangements in said first and second states.

13. A digital-to-analog converter for converting a set of digit input signals to an analog output signal representative of the characteristics of the input signals, including, output apparatus for receiving the analog output signal, an impedance network coupled to said output apparatus for coupling to said output apparatus particular portions of signals introduced to said impedance network to provide a weighting of such signals in accordance with the weighted value of successive digits represented by the input signals, a source of two reference potentials having alternating characteristics at a particular frequency and having an opposite phase relationship, a plurality of switching arrangements each having first and second states of operation and each coupled between said source and said impedance network for introducing a particular one of said two reference potentials from said source to said impedance network, each of said switching arrangements including first and second switching transistors each having a normal state with a high impedance and an operative state with a low impedance, said switching transistors each having base, emitter and collector electrodes, an input connection coupled to said emitter electrodes of said first and said second transistors in each switching arrangement for receiving input signals to be coupled through a particular one of said first and said second transistors, a common output connection coupled to said collector electrodes of said first and said second switching transistors for receiving input signals coupled through either said first or said second switching transistors, means coupled to said base electrodes of said first and said second transistors for reversing the operative conditions of said transistors, means coupled to said first and said second transistors for sequentially changing the states of said transistors with a change from an operative state to a normal state being initiated first so that both of said transistors cannot be in their operative states at the same time, and means coupled to said plurality of switching arrangements for selectively operating said switching arrangements in the first and second states in accordance with the characteristics of the input signals.

References Cited by the Examiner

UNITED STATES PATENTS

| | | | |
|---|---|---|---|
| 2,814,006 | 11/1957 | Wilde | 318—20 |
| 2,870,429 | 1/1959 | Hales | 340—347 |
| 2,870,437 | 1/1959 | Scarrott et al. | 340—347 |
| 2,881,419 | 4/1959 | Rothbart | 340—347 |
| 2,903,602 | 9/1959 | Fleisher | 307—88.5 |
| 2,937,290 | 5/1960 | Kan Chen | 307—88.5 |
| 2,943,248 | 6/1960 | Ritchey | 340—347 |
| 3,019,426 | 1/1962 | Gilbert | 340—347 |

MALCOLM A. MORRISON, *Primary Examiner.*

IRVING L. SRAGOW, EVERETT R. REYNOLDS, *Examiners.*